United States Patent
Beraud et al.

(10) Patent No.: US 9,796,141 B2
(45) Date of Patent: Oct. 24, 2017

(54) METHOD FOR MAKING AN INTERMEDIATE REINFORCING MATERIAL CONSISTING OF AN ARRAY OF SPACED-APART YARNS/WEBS

(71) Applicant: Hexcel Reinforcements, Dagneux (FR)

(72) Inventors: Jean-Marc Beraud, Rives (FR); Jacques Ducarre, La Tour du Pin (FR); Jean-Benoit Thiel, La Chapelle de la Tour (FR)

(73) Assignee: Hexcel Reinforcements, Dagneux (FR)

( * ) Notice: Subject to any disclaimer, the term of this patent is extended or adjusted under 35 U.S.C. 154(b) by 223 days.

(21) Appl. No.: 14/821,057

(22) Filed: Aug. 7, 2015

(65) Prior Publication Data
US 2015/0367582 A1    Dec. 24, 2015

Related U.S. Application Data

(62) Division of application No. 13/808,440, filed as application No. PCT/FR2011/051764 on Jul. 21, 2011, now Pat. No. 9,132,606.

(30) Foreign Application Priority Data

Jul. 22, 2010 (FR) ................................. 10 56020

(51) Int. Cl.
*B29C 70/20* (2006.01)
*B29C 70/08* (2006.01)
(Continued)

(52) U.S. Cl.
CPC ............ *B29C 70/202* (2013.01); *B29C 70/08* (2013.01); *B29C 70/086* (2013.01); *B32B 3/14* (2013.01);
(Continued)

(58) Field of Classification Search
CPC ..... B29C 70/202; B29C 70/08; B29C 70/086; B32B 3/14; B32B 3/18
(Continued)

(56) References Cited

U.S. PATENT DOCUMENTS

| 6,503,856 B1 | 1/2003 | Broadway et al. |
| 6,828,016 B2 | 12/2004 | Mitani et al. |

(Continued)

FOREIGN PATENT DOCUMENTS

| EP | 1469113 | 8/2007 |
| EP | 1125728 | 5/2011 |

(Continued)

OTHER PUBLICATIONS

English Translation of WO2010-046609.

*Primary Examiner* — Brent O'Hern
(74) *Attorney, Agent, or Firm* — W. Mark Bielawski; David J. Oldenkamp

(57) ABSTRACT

The present invention relates especially to an intermediate material comprising, or even constituted exclusively by, an array of individualised ribbons, each ribbon being composed by a tape of unidirectional reinforcing fibres associated, by adhesion, on each of its faces with a veil of thermoplastic fibres, characterised in that the ribbons are disposed in successive layers, in such a way that the ribbons of two successive layers are superposed with or without crossing but without interlacement, the bond between a ribbon and the ribbon or ribbons with which it is superposed being ensured by adhesion, and in that in each layer the ribbons are disposed substantially parallel to each other over at least the major part of their length, while being independent and spaced from each other and in that the ribbons of at least two layers extend in two different directions.

20 Claims, 4 Drawing Sheets

(51) Int. Cl.
   *B32B 5/08* (2006.01)
   *B32B 5/12* (2006.01)
   *B32B 5/26* (2006.01)
   *B32B 5/02* (2006.01)
   *B32B 3/14* (2006.01)
   *B32B 3/18* (2006.01)
   *B29K 263/00* (2006.01)
   *B29K 307/04* (2006.01)

(52) U.S. Cl.
   CPC ............... *B32B 3/18* (2013.01); *B32B 5/022* (2013.01); *B32B 5/08* (2013.01); *B32B 5/12* (2013.01); *B32B 5/26* (2013.01); *B29K 2263/00* (2013.01); *B29K 2307/04* (2013.01); *B32B 2250/20* (2013.01); *B32B 2260/023* (2013.01); *B32B 2260/046* (2013.01); *B32B 2262/02* (2013.01); *B32B 2262/106* (2013.01); *Y10T 428/24058* (2015.01); *Y10T 428/24074* (2015.01); *Y10T 428/24091* (2015.01); *Y10T 428/24099* (2015.01); *Y10T 428/24124* (2015.01)

(58) Field of Classification Search
   USPC .......................................................... 156/292
   See application file for complete search history.

(56) References Cited

U.S. PATENT DOCUMENTS

| | | |
|---|---|---|
| 6,995,099 B1 | 2/2006 | Nishimura et al. |
| 2003/0224141 A1 | 12/2003 | Maupetit et al. |
| 2012/0015135 A1 | 1/2012 | Beraud et al. |
| 2012/0015167 A1 | 1/2012 | Beraud et al. |
| 2012/0202004 A1 | 8/2012 | Beraud et al. |

FOREIGN PATENT DOCUMENTS

| | | | | |
|---|---|---|---|---|
| WO | 2006121961 | 11/2006 | | |
| WO | 2007015706 | 2/2007 | | |
| WO | 2010046609 | 4/2010 | | |
| WO | WO 2010046609 A1 * | 4/2010 | ........... | B29C 70/083 |
| WO | 2010061114 | 6/2010 | | |

* cited by examiner

METHOD FOR MAKING AN INTERMEDIATE REINFORCING MATERIAL CONSISTING OF AN ARRAY OF SPACED-APART YARNS/WEBS

This application is a divisional of application Ser. No. 13/808,440, which was filed on Jan. 4, 2013, and issued as U.S. Pat. No. 9,132,606 on Sep. 15, 2015, and which is a 371 of PCT/FR2011/051764, which was filed on Jul. 21, 2011.

BACKGROUND OF THE INVENTION

1. Field of the Invention

The present invention relates to the technical field of reinforcing materials, adapted to the constitution of composite pieces. More precisely, the invention relates to a novel intermediate material constituted by an array of ribbons of unidirectional fibres for making composite pieces, by subsequent injection or infusion of thermosetting, thermoplastic resin, or a mixture of the two, a manufacturing process of such intermediate material, as well as a manufacturing process of composite pieces from such intermediate material, and the resulting composite pieces.

2. Description of Related Art

The manufacture of composite pieces or articles, that is, comprising on the one hand one or more reinforcements or fibrous tapes and, on the other hand, a matrix mainly of thermosetting (<<resin>>) type and capable of including thermoplastic, can for example be made by a so-called "direct" or "LCM process" (from the English <<Liquid Composite Moulding>>). A direct process is defined by the fact that one or more fibrous reinforcements are used in the "dry" state (that is, without the final matrix), the resin or matrix being used separately, for example by injection in the mould containing the fibrous reinforcements ("RTMI" process, from the English term Resin Transfer Moulding), by infusion through the thickness of the fibrous reinforcements ("LRI" process, from the English <<Liquid Resin Infusion>> or process "RFI", from the English <<Resin Film Infusion>>), or else by manual coating/impregnation by roller or brush on each of the unitary layers of fibrous reinforcement, applied successively to the form.

For the RTM, LRI or RFI processes, in general a fibrous preform of the form of the planned finished article should be made first, then this preform should be impregnated with resin. The resin is injected or infused by differential of pressures and temperature, then once the entire quantity of necessary resin is contained in the preform, the whole is brought to a higher temperature to complete the polymerisation/reticulation cycle and cause curing.

The composite pieces used in the automobile, aeronautics or naval industry are in particular subjected to very strict demands, especially in terms of mechanical properties. The mechanical properties of the pieces are mainly linked to a parameter which is the volume rate of fibres (TVF).

In these sectors, a large number of preforms is made based on reinforcing material, mainly of carbon fibres, especially of the unidirectional type. It is possible to theoretically calculate the maximal volume rate of fibres contained in a unidirectional tape by supposing two types of arrangements: hexagonal or square. Supposing respectively an arrangement of hexagonal type and an arrangement of square type, the maximum TVF obtained is respectively 90.7% and 78.5% (An Introduction to Composite Materials, D. Hull, T. W. Clyne, Second Edition, Cambridge Solid State Science Series, 1996). But in reality it seems difficult to get volumic fractions of fibres over 70% for composite pieces. In practice, it is commonly admitted by the expert that a volume rate of fibres (TVF) of around 60% is standard for making satisfactory composite pieces, especially with good reproducibility (S. T. Peters, <<Introduction, composite basics and road map>>, in Handbook of Composites, Chapman & Hall, 1998, p. 1-20 and in particular p. 8).

The resin which is subsequently associated, especially by injection or infusion, with unidirectional reinforcing tapes during production of the piece can be thermosetting resin, for example of epoxy type. For proper flow through a preform comprising a stack of different layers of carbon fibres, this resin is most often highly fluid, for example with a viscosity of the order of 50 to 200 mPa·s. at infusion/injection temperature. The major disadvantage of this type of resin is its fragility after polymerisation/reticulation, which causes low resistance to the impact of composite pieces produced.

To resolve this problem, it has been proposed in documents of the prior art to associate unidirectional layers of carbon fibres with a veil of thermoplastic fibres. Such solutions are especially described in patent applications or patents EP1125728, US 628016, WO 2007/015706, WO 2006/121961 and U.S. Pat. No. 6,503,856. The addition of this veil improves the mechanical properties in a compression test after impact (CAI), a test currently being used to characterise the resistance of structures to impact.

In prior patent applications WO 2010/046609 and WO 2010/061114 the applicant has also proposed particular intermediate materials comprising a tape of unidirectional fibres, carbon in particular, associated by adhesion, on each of its faces to a veil of thermoplastic fibres (also called non-woven), as well as their preparation process. The unidirectional tapes ensuring total cover, for some applications especially for making pieces of substantial thickness, one of the limitations of this type of intermediate material is its low transverse permeability to resin which will be injected or infused to constitute the final piece. In this context, a solution has been proposed in patent application WO 2010/046609 consisting of making holes extending into the material, allowing it to have a given opening factor. This solution can be used in practice on tapes of width greater than around 20 mm, and preferentially greater than 50 mm, though is more difficult to implement in the case of threads/tape of lesser widths. Widths of 3.17 mm or 6.35 mm are used for example in automatic deposit on existing machines and therefore present a particular interest.

SUMMARY OF THE INVENTION

The aim of the present invention is to eliminate and/or limit the problems hereinabove and/or contribute improvements in general. Also, one of the aims of the present invention is to propose a novel intermediate product, adapted to producing composite pieces based on thermosetting or thermoplastic resin, and especially by injection or infusion of resin which has satisfactory permeability and allows minimal diffusion times of the resin, even in the case of designing pieces of considerable thickness, for example over 20 mm.

Another aim of the invention is to satisfy this specification while proposing an intermediate product which is easy to manufacture and adapted to automated processes.

Another aim of the invention is also of propose an intermediate product which may be directly made in shape on a mould of form adapted to the preferred final composite piece and therefore is in the form of a preform.

In this context, the invention relates to the intermediate materials, process and composite pieces such as defined in the claims.

In particular, the intermediate material according to the invention comprises, or even is constituted exclusively by, an array of individualised ribbons, each ribbon being composed by a closed tape of unidirectional reinforcing fibres associated on each of its faces with a veil of thermoplastic fibres, the bond between the tape of unidirectional fibres and the veils of thermoplastic fibres being ensured by adhesion, and especially by at least partial fusion of thermoplastic fibres, characterised in that the ribbons are disposed side by side in successive layers, and especially in at least four layers in such a way that the ribbons of two successive layers are superposed with or without crossing but without interlacement, the bond between a ribbon and the ribbon or ribbons with which it is superposed being ensured by adhesion, and especially by at least partial fusion of thermoplastic fibres, and in that in each layer the ribbons are disposed substantially parallel to each other at least over the major part of their length, while being independent and spaced apart from each other and in that the ribbons of at least two layers extend in two different directions.

Various other characteristics of the material according to the invention are detailed in the claims.

The material according to the invention is designed for making composite pieces by a direct process. Also, the mass of non-wovens, within each veiled ribbon, represents from 0.1 to 10% and preferably from 3 to 10% of the total mass of each ribbon.

Another aim of the invention is a manufacturing process of an intermediate reinforcing material or of a preform according to the invention comprising the following steps:
a) having at least one individualised ribbon, composed by a closed tape of unidirectional reinforcing fibres associated on each of its faces with a veil of thermoplastic fibres, the bond between the tape of unidirectional fibres and the veils being ensured by at least partial fusion of the thermoplastic fibres,
b) disposing such ribbons side by side and in successive layers, especially in at least four layers, in such a way that the ribbons of two successive layers are superposed with or without crossing but without interlacement, and such that in each layer the ribbons are disposed substantially parallel to each other over at least the major part of their length, while being independent and spaced apart from each other, and the ribbons of at least two layers extend in two different directions,
c) ensuring the bond between a ribbon and the ribbon or ribbons with which it is superposed by at least partial fusion of the thermoplastic fibres.

Another aim of the invention is a manufacturing process of a composite piece, characterised in that it comprises the following steps:
a) having at least one intermediate reinforcing material or a preform according to the invention,
b) optionally stacking different materials as claimed in any one of the preceding claims and optionally combining them in the form of a preform,
c) adding by infusion or injection a thermosetting and/or thermoplastic resin,
d) consolidating the preferred piece via a polymerisation/ reticulation step following a cycle defined in temperature and under pressure, followed by cooling.

According to a particular embodiment of the process according to the invention, the thermosetting resin is added by infusion under pressure less than the atmospheric pressure, especially at a pressure less than 1 bar and, for example, between 0.1 and 1 bar.

According to another of its aspects, the invention relates to the composite pieces likely to be obtained according to such a process, which especially have a volume rate of fibres (TVF) of 50 to 63%, preferably 53 to 60%.

According to another embodiment, the invention provides a moulding material comprising a multitude of folds, each fold comprising des ribbons of renfort oriented and spaced, the orientation of the ribbons in a fold differing from the orientation of the ribbons in the adjacent fold, each ribbon comprising a fibrous reinforcing material.

The moulding material can also comprise a bonding material for maintaining the orientation of the ribbons. This bonding material can comprise a fibrous thermoplastic material.

Various other characteristics will emerge from the following description in reference to the attached diagrams.

BRIEF DESCRIPTION OF THE DRAWINGS

FIG. 2A is a view in partial perspective of a layer of ribbons in a bossing zone and FIG. 2B is a partial corresponding plan view.

DETAILED DESCRIPTION OF THE INVENTION

Figure 1:
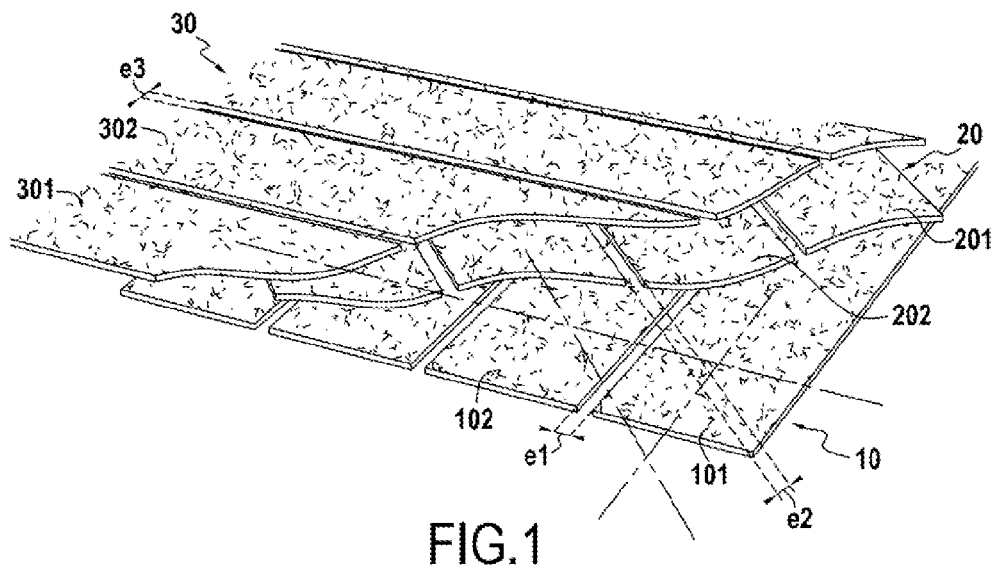
FIGS. 1, 2A and 2B schematically show different constructions which can be presented by an intermediate material according to the invention.
Figure 2A:
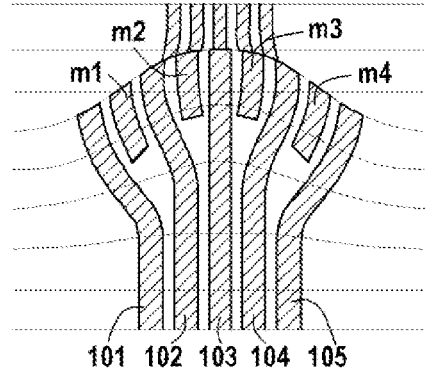
Figure 2B:
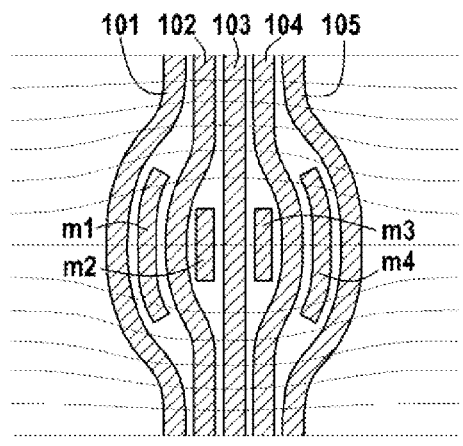

The invention proposes materials made by depositing ribbons, some of which at least, and preferably all, are so-called veiled ribbons. Within the scope of the invention, the unidirectional threads or filaments constituting the ribbons are associated on each of their faces with non-wovens (also called veils), before their use to constitute the intermediate material according to the invention. Also, in the material according to the invention, each veiled ribbon is constituted by a tape of unidirectional reinforcing fibres associated with two non-wovens over its entire length. As presented in FIG. 1, within the scope of the invention, different ribbons 100, 101, . . . 200, 201, . . . 300, 301, . . . are disposed flat side by side and in successive layers 10, 20, 30 . . . , while being spaced apart from each other in each layer by a distance e1, e2, e3 . . . The first series 10 (also called layer or fold) of ribbons is deposited on a plane surface as illustrated in FIG. 1 or in the form as illustrated by FIGS. 2A and 2B. A second series 20 of ribbons side by side and spaced is then placed flat or shaped, for example in an orientation different to that of the first series 10. The next step is a stack of different series of ribbons parallel to each other in each series, and preferably of at least four series, as a function of the thickness and preferred orientations, by analogy with a conventional unidirectional material. All the layers of ribbons can have different directions or only some of them might, the others able to have identical directions. The preferred orientations are most often oriented in directions forming an angle of 0°, +45° or −45° (corresponding also to +135°), and +90° with the principal axis of the piece to be made. The principal axis of the piece is generally the largest axis of the piece and the 0° combines with this axis. It is for example possible to make quasi-isotropic or symmetrical stacks or stacks oriented from selecting the orientation of the folds. By way of example of a quasi-isotropic stack, there are those stacks according to the angles 45°/0°/135°/90°, or 90°/135°/0°/45°. By way of example of symmetrical stacks, there are 0°/90°/0°, or 45°/135°/45°. In each series, the ribbons extend substantially parallel to each other, except for example in bossing zones 11 where additional bits of ribbons m1, m2 . . . can be positioned between strips 100, 101 . . . , creating zones of non-parallelism, as illustrated by FIGS. 2A and 2B. These bits of ribbons are introduced to respect the preferred direction of the threads, but compensate for the differences of length due to bossing. The insertion of segments of ribbon is done only in extreme cases. When this is possible, spacing will be created in curving zones between two strips or series of strips slightly different comparatively to the inter-strips space present on the plane zones of the same piece. Consequently, in each layer or fold, the ribbons are positioned parallel to each other over their entire length, with the exception of curving or bossing zones where non-parallelism can be introduced especially due to the difference in distance to be travelled by two adjacent ribbons.

Figure 3A:
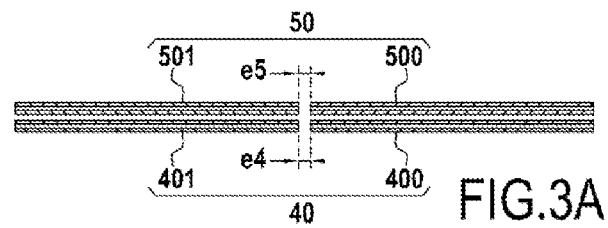
FIGS. 3A and 3B are schematic sectional views showing the positioning which can be taken by ribbons of successive layers oriented in the same direction, in an intermediate material according to the invention.

The presence of spacings between two adjacent ribbons within the same series increases plane instances of permeability (that is, parallel to the tapes of fibres) and transverse instances (that is, transversally to the tapes of threads) of the intermediate material according to the invention, relative to material where the unidirectional tapes would ensure total coverage. Especially, within the scope of the invention transverse permeability in saturated state of $10^{-14}$ m$^2$ and $2.10^{-14}$ m$^2$ can be obtained. For such permeability to be ascertained however, the ribbons of two successive layers must be disposed so that there is total coverage of the spaces between ribbons of one of the layers by the ribbons of the other layer. This is the case especially:

either when there is no successive layer in which the ribbons extend in identical directions, or when there are successive layers 40 and 50 in which the ribbons are oriented in identical directions, but where there is perfect or quasi-perfect superposition of ribbons of layers in which the ribbons are oriented in identical directions, as illustrated by FIG. 3A. In fact, the ribbons 400 and 401 of the layer 40 are superposed with the ribbons 500 and 501 of the layer 50. The strips of two successive layers of identical orientation must not be offset relative to the others, according to offsetting which would cause total coverage of the inter-ribbon spaces by the ribbons of the lower or upper layer.

Figure 3B:
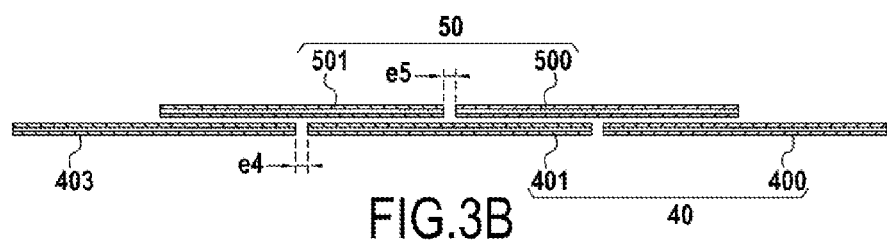

In fact, in the case illustrated in FIG. 3B where the strips of two successive layers are offset by a demi-width of strip such that the spaces of one or the other of the layers coincide with the strips of the other layer, permeability is not improved. All the same, such material is easy to design, especially for making preforms on moulds shaped, depositing strips of minimal width being easier than depositing sheet material of greater width.

By way of advantage, each layer of ribbons has an opening factor belonging to the range 0.5 to 9%, preferably 3 to 6%. This opening factor is the opening factor of each layer taken individually, by abstracting from the other layers. The opening factor is for example determined according to the method described in patent application WO 2010/046609 which could be referred to for more details. To undertake this on a single fold, the deposit could be made on a transparent vacuum tarpaulin, with adhesion occurring in the same way as with a preceding fold constituted by a strip of the same material. Such opening factors produce interesting levels of permeability comparable to or greater than those obtained with traditional sewn multiaxial fabrics. For example, in each series (also called layer) of parallel ribbons, the width of ribbon/spacing ratio between two adjacent ribbons belongs to the range going from 7 to 150, preferentially to the range going from 15 to 40. Most often, in each layer, or even in all layers of ribbons, all the ribbons will have a substantially identical width and the spaces (e1, e2, e3, e4, e5 . . . as shown in FIGS. 1, 3A and 3B) between two adjacent ribbons will also be substantially identical. In addition, it is preferable for the spacing between two adjacent ribbons within a layer in the parallelism zones to be at most 0.4 mm to avoid the creation of resin piles during the design of the final piece, which would be especially a source of microcracking after hygrothermal cycle. This spacing value corresponds to an average on the parallelism zones. This spacing belongs for example to the range going from 0.1 to 0.4 mm, preferably to the range going from 0.2 to 0.4 mm. All the same, it is possible in the zones of curving or of bossing where the ribbons are locally non-parallel (called zones of non-parallelism) for the inter-ribbon space to be slightly larger.

The ribbons of the same series or layer are individual from and independent of one another, as compared especially to ribbons of unidirectional fibres which would be connected together by one and the same veil. The ribbons of the same series are connected solely by the presence of ribbons of other layers crossing them and ensuring the bond of the array. The bond of the array is ensured by the bond between a ribbon and the ribbon or ribbons with which it is superposed, this bond being made by adhesion. To ensure cohesion of the array, at least two layers of ribbons have different orientations. This bond is most often made by at least partial fusion of the thermoplastic fibres comprising the veils, followed by cooling. This fusion can be ensured throughout the depositing of each veiled ribbon, by analogy with the process described in patent application EP 1 469 113 in the name of the applicant, or in a thermo-compression step on one or more complete folds or over part of their surface only, for example on the external parts of the pieces to be made, for example their periphery, on a support of plane or more complex form. The fusion can also be ensured flat on a part of the form to be made, this fusion between folds being carried out particularly on those zones not needing movement between folds during thermo-compression, the rest of the folds remaining free of any movement by enabling all folds to be made shaped by movement of the threads from folds remaining unattached to lower folds. It is also not excluded that the veils are covered by another polymeric binder, for example a thermosetting powder, of epoxy type especially, which would ensure or contribute to the bond. There is preferably no bond between the different layers of ribbons done by sewing and/or knitting.

Another advantage of the material according to the invention made from individual and independent strips constituted by unidirectional reinforcing fibres associated on each of their faces with a non-woven of thermoplastic fibres is found especially at the level of deformability, and ease of preform design on moulds of complex shape. In fact, directly using ribbons carrying non-wovens, which will contribute the preferred mechanical properties to the final piece, offers numerous design possibilities. For example, the material according to the invention can be obtained directly by deposit of veiled ribbon on a flat support or shaped according to the preferred form of the piece. The material according to the invention can be made shaped directly, the shape being maintained due to fusion/cooling of the thermoplastic fibres, or in a plane sheet which could then be positioned and draped, after light heating, over a mould of complex shape, during design of the final piece.

Figure 4:
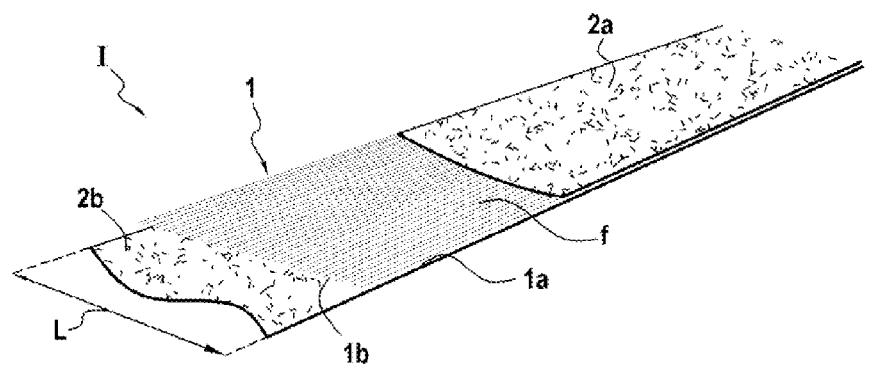
FIGS. 4 and 5 are respectively a schematic perspective representation, partially exploded and in section, of a ribbon used within the scope of the invention, in which a unidirectional tape is associated with two non-wovens.
Figure 5:
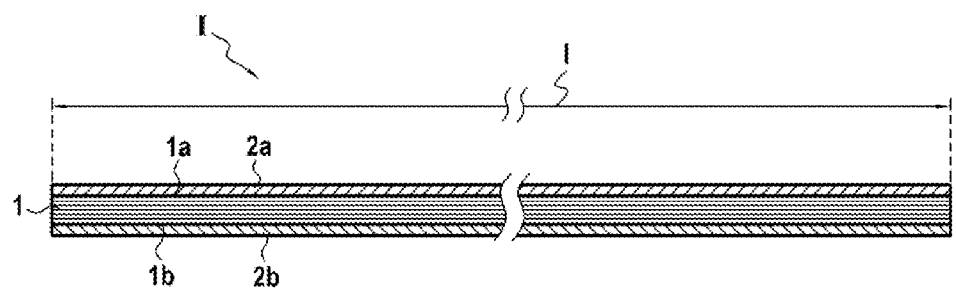

Within the scope of the invention, ribbon or strip means sheet material which has a length much greater than its width. Such ribbons can especially have widths of 3 to 25 mm. The veiled ribbons can be made from one or more threads, a thread being constituted by an array of filaments. Voiles ribbons of lesser width can even be obtained in the case where a very fine thread of 1K or 3K is used. As shown in FIG. 4, the veiled ribbons I used within the scope of the invention have a length l and a width L. These veiled ribbons comprise an array of filaments f (case of a single thread 1) or an array of threads 1 (each constituted by an array of filaments) which extend parallel to the width of the ribbon. A veiled ribbon has a general rectangular shape and is associated on each of its large faces 1*a* and 1*b* with a non-woven (respectively 2*a* and 2*b*), as shown in FIG. 5.

Non-woven, which can also be called <<veil>>, conventionally means a mat of continuous or short fibres arranged randomly. These non-wovens or veils could be produced for example by the <<Meltblow>>, <<Spunlaid>> or <<Electrospinning>> processes well known to the expert. In particular, the fibres making up the non-woven can have average diameters in the range going from 0.5 and 70 µm, and preferentially from 0.5 and 30 µm. The non-wovens can comprise short fibres or preferably continuous fibres. In the case of a non-woven of short fibres, the fibres can have a length between 1 and 100 mm, for example. The use of non-wovens which have random and isotropic coverage gives each veiled ribbon uniform cohesion and in all directions, contrary to using threads of spaced bond, for example. For each veiled ribbon, the bond between the non-wovens and the unidirectional tape has been previously ensured, by heating, in using the hot-adhesive character of thermoplastic non-wovens, followed by cooling. By way of example, the fibres constituting non-wovens are advantageously constituted by thermoplastic material, especially selected from: Polyamides (PA, for example PA6, PA12, PA11. PA6,6, PA 6,10, PA 6,12, . . . ), Copolyamides (CoPA), Polyamides—block ether or ester (for example, PEBAX, PEBA), polyphthalamide (PPA), Polyesters (for example, Polyethylene terephthalate—PET-, Polybutylene terephthalate—PBT- . . . ), Copolyesters (CoPE), polyurethanes thermoplastic (TPU), polyacetals (POM), Polyolefins in C2-C8 (for example, polypropylenes—PP, high-density polyethylenes—HDPE, low-density polyethylenes—LDPE, low-density linear polyethylenes—LLDPE . . . ) and/or copolymers of the latter, Polyethersulfones (PES), polysulfones (PSU), polyphenylene sulfones (PPSU), Polyetheretherketones (PEEK), PolyetherKetoneKetone (PEKK), Poly(phenylene sulfide) (PPS), or Polyetherimides (PEI), thermoplastic polyimides, liquid crystal polymers (LCP), phenoxys, block copolymers such as Styrene-Butadiene-Methylmethacrylate (SBM) copolymers, Methylmethacrylate-Acrylate of Butyl-Methylmethacrylate (MAM) copolymers and their mixtures. The non-wovens can comprise fibres of the same type, but also a mixture of fibres constituted by these thermoplastic materials. The substance is adapted of course to different types of thermosetting or thermoplastic systems used to constitute the matrix, during subsequent production of the composite pieces.

Each veiled ribbon used for the constitution of the intermediate material according to the invention has, on each of its large faces, a non-woven of thermoplastic fibres which ensures its cohesion. In particular, by way of non-woven of thermoplastic fibres, non-wovens marketed for example by the companies Protechnic (66, rue des Fabriques, 68702—CERNAY Cedex—France) or Spunfab Ltd./Keuchel Associates, Inc. (175 Muffin Lane Cuyahoga Falls, OH 44223, USA) can be used.

Within the scope of the invention, << unidirectional tape of reinforcing fibres >> means a tape exclusively or quasi-exclusively comprising reinforcing fibres deposited parallel to each other. In particular, according to a particular embodiment of the invention, the unidirectional tape comprises no weft thread interlacing the reinforcing fibres to avoid any undulation. In particular, the intermediate material according to the invention comprises neither weaving, nor sewing, nor knitting. In the unidirectional tape, the carbon threads are preferably not associated with a polymeric binder and therefore qualified as dry, that is, they are neither impregnated, nor coated, nor associated with any polymeric binder before being joined to the thermoplastic veils. The carbon fibres are, however, most often characterised by a standard mass yarning rate which can represent at most 2% of their mass.

Unidirectional tapes can comprise one or more reinforcing threads. By way of example, the reinforcing threads can be made of material selected from the following materials: carbon, glass, aramid, silica, basalt, ceramic and their mixtures, or any other material used in the composite materials field, the fibres able to be natural or synthetic. Carbon fibres are preferred, however.

Within each ribbon the filaments or reinforcing fibres are disposed to ensure a quasi-total coverage, and preferably total, over the entire surface of the ribbon. In particular, when the veiled ribbon is constituted by a unidirectional tape of several threads, these will be arranged edge to edge, with a minimum, or any lack of material (<<gap>> in English) or overlap (<<overlap>> en English). The unidirectional tape and therefore the veiled ribbon used can therefore be qualified as closed.

A thread is generally constituted by an array of filaments and in the case of carbon threads comprises generally from 1000 to 80,000 filaments, advantageously from 12,000 to 24,000 filaments. In a particularly preferred manner within the scope of the invention, carbon threads of 1 to 24 K, for example, 3K, 6K, 12K or 24K, and preferentially 12 and 24K, are used. The constituent fibres are preferably continuous. The threads present within the veiled ribbons have a substantially parallelepipedic or elliptical cross-section and are qualified as flat threads. These threads have a certain width and thickness. By way of example, a flat carbon thread of 3K and yarn density of 200 tex generally has a width of 1 to 3 mm, a flat carbon thread of 12K and yarn density of 446 tex, a width of 2 to 5 mm, a flat thread of 12K yarn density of 800 tex, a width between 3 and 7 mm, a flat carbon thread of 24K and yarn density of 1600 tex, a width of 5 to 12 mm and a flat carbon thread of 24K and yarn density of 1040 tex, a width of 5 to 10 mm. A flat carbon thread of 3000 to 24,000 filaments will therefore most often have a width of 1 to 12 mm. For some embodiments, the carbon threads present within the veiled ribbons have a density of between 60 and 3800 tex, and preferentially between 400 and 900 tex. Before the thread or threads are joined to the veils to make the ribbons, it is possible to spread out threads used conventionally and commercially available or not. By way of example, the thickness of the unidirectional tape of carbon within a ribbon can be from around 90 to 270 μm. Examples of carbon threads are High-Resistance (HR) threads whereof the tensile modulus is between 220 and 241 GPa and whereof the tensile breaking strength is between 3450 and 4830 MPa, Intermediate Modulus (IM) threads whereof the tensile modulus is between 290 and 297 GPa and whereof the tensile breaking strength is between 3450 and 6200 MPa and the High-Modulus (HM) threads whereof the tensile modulus is between 345 and 448 GPa and whereof the tensile breaking strength is between 3450 and 5520 Pa (according to the <<ASM Handbook>>, ISBN 0-87170-703-9, ASM International 2001).

The veiled ribbons such as previously described, and some more specific examples of which will be given, throughout the description and the examples, are used within the scope of the invention to manufacture intermediate materials, intended to be associated with a resin matrix for subsequent production of composite pieces, for aeronautics especially. The resin matrix can be thermoplastic or preferably thermosetting in nature or comprising a mixture of thermosetting and thermoplastic resins. In the intermediate materials according to the invention, these veiled ribbons are disposed side by side to leave spacing between two adjacent ribbons. Each array of ribbons deposited substantially parallel to each other is called a layer. To constitute the intermediate material, different layers, and most often at least four layers, are superposed and optionally criss-crossed without interlacement. The intermediate materials according to the invention preferably and exclusively comprise veiled ribbons composed of a series of reinforcing threads or filaments which extend in a direction parallel to the length of the ribbon to form a unidirectional tape which is associated on each of its faces with a non-woven of thermoplastic fibres, these two non-wovens ensuring cohesion of said veiled ribbon due to their thermoplastic character. In particular, intermediate materials according to the invention are exclusively constituted by an array of veiled ribbons such as described more specifically in the present patent application. It is not however excluded that in the intermediate materials according to the invention these veiled ribbons are combined with other ribbons such as single threads or other. In fact, these veiled ribbons can for example be used only in some orientations of a multiaxial material, the threads of other orientations being classic and not veiled, or even being constituted exclusively or not by other types of dry reinforcements such as a braid, a fabric or a sewn multiaxial.

Patent applications WO 2010/046609 and WO 2010/061114, to which reference could be made for more details, describe particular types of veiled ribbons of carbon fibres which produce intermediate materials according to the invention, which especially will subsequently make composite pieces which at the same time will combine good mechanical properties and a high volume rate of fibres, preferred properties especially in the aeronautics field. According to a preferred embodiment, each veiled ribbon making up the intermediate material according to the invention is constituted by a unidirectional tape of carbon fibres having a surface mass of 100 to 280 g/m2, associated on each of its faces with a non-woven of thermoplastic fibres, said non-wovens each having a thickness of 0.5 to 50 microns, preferably of 3 to 35 microns. According to a particular embodiment, each veiled ribbon has a thickness of 80 to 380 microns, preferably of 90 to 320 microns, and preferentially of 93 to 305 microns. Within the scope of the present invention, the thicknesses and the grammages are determined for example according to the techniques described in patent application WO 2010/046609.

Advantageously, the thickness of each veiled ribbon present within the intermediate product according to the invention has low variability, especially with variations in thicknesses not exceeding 20 μm in terms of standard deviation, preferably not exceeding 10 μm in terms of standard deviation. This characteristic improves the regularity of composite pieces which can be obtained.

In addition, the surface mass of the veil present within each veiled ribbon is advantageously in the range going from 0.2 to 20 g/m$^2$.

In each ribbon, the association between the unidirectional tape and the veils can be made discontinuous, for example solely at some points or zones, but is preferably done according to a bond qualified as continuous, which extends over the entire surface of the tape. The association of the unidirectional tape with the two veils can be achieved by means of an adhesive layer, for example selected from epoxide adhesives, polyurethane adhesives, thermosetting adhesives, adhesives based on polymerisable monomers, structural acrylic or modified acrylic adhesives, hot-melt adhesives. But most often the association is made due to the adhesive character of hot veils, for example during a thermocompression step when they are designed, ensuring a bond between the unidirectional tape and the veils. The bond is therefore most often, at least in part, ensured by at least partial fusion of the thermoplastic fibres of the veils, followed by cooling. As is preferred, the cohesion of each veiled ribbon is ensured in the absence of sewing, weaving or knitting. Advantageously, the bond between the unidirectional tape and the veils is ensured exclusively by the thermoplastic non-wovens.

According to a particular embodiment, each veiled ribbon has a given width substantially constant over its entire length, that is, the veiled ribbons have very low variability in width over their entire length. In this case, because of the substantially constant width of the veiled ribbons used, the veiled ribbons according to the invention also have very low variability in terms of surface mass. In particular, the width of each veiled ribbon has, over the entire length of said ribbon, a type of deviation especially less than 0.25 mm, preferably less than 0.22 mm and preferentially less than or equal to 0.20 mm. Low variability in width especially subsequently produces pieces with considerable regularity, with controlled mechanical properties. The width of the veiled ribbons and the deviation type can be determined according to the method given in patent application WO 2010/061114. Such a veiled ribbon of substantially constant width can be obtained according to the process described in patent application WO 2010/061114, which could be referred to for more details.

According to a particular embodiment which can be combined with the preceding ones, each veiled ribbon has no cut fibres on its longitudinal edges. This makes the use of the latter much easier in automatic deposit processes. In fact, the disadvantage of the presence of fibres or filaments cut at the edge of a ribbon is to create accumulation zones of fibres or filaments T some points along the trajectory of the ribbon in the processes cited, and cause machine stoppages due to thread breaks or poor quality of the reinforcement created. These edges with presence of cut filaments are also generators of threads rolling up on themselves even during unwinding of the spool containing the ribbon, the consequence of which is also thread breaks or quality defects (such as <<rings>> created on the ribbon spool). Such a characteristic is made possible especially by the process previously described in patent application WO 2010/061114.

Also, according to a particular embodiment which can be combined with the preceding ones, each veiled ribbon has at some points only of its longitudinal edges or over the entire length of its two longitudinal edges a direct bond between the two non-wovens, achieved due to the thermoplastic character of the latter.

The intermediate materials according to the invention can be used for making aeronautics articles which require high levels of mechanical performance, and especially for making pieces of primary structure, but also for the design of pieces in the fields of automobiles, wind turbines, high-pressure reservoirs or other industrial applications where the mechanical characteristics do not have the same importance but where the intermediate product according to the invention could be relevant in terms of speed of diffusion of the resin injected or infused subsequently. Such pieces could be made by any known direct process, such as processes by infusion or injection of thermosetting or even thermoplastic resins. The matrix used is preferably of thermosetting type. The injected resin will be selected for example from the following thermosetting polymers: epoxides, unsaturated polyesters, vinyl esters, phenolics, polyimides, bismaleimides. The composite piece is obtained after a thermal processing step. In particular, the composite piece is generally obtained by a cycle of classic consolidation of relevant polymers by conducting thermal processing, recommended by the suppliers of these polymers and known to the expert. This consolidation step of the preferred piece is carried out by polymerisation/reticulation following a cycle defined in temperature and under pressure, followed by cooling. The pressure applied during the processing cycle is low in the case of infusion under vacuum and is stronger in the case of injection in a RTM mould.

In some cases, the intermediate material and the process according to the invention produce composite pieces having a TVF of the order of 60%, which corresponds to the standard rate for primary structures in aeronautics (that is, the vital pieces for the apparatus) and also definitively produce resistance to low-speed impact of the resulting composite pieces: for example, the a tool falling in a workshop during manufacture of a composite structure, shock from a foreign body when used as a ground-based operation.

The pressure applied during an injection process is greater than that used during an infusion process. Also, injection processes generally use closed moulds, resulting in greater ease in making pieces with a correct TVF via a process of injection or infusion. The materials according to the invention create the preferred volume rate of fibres, and especially of the order of 53 to 60%, even when the composite piece is made with a step c) such as mentioned previously, which uses infusion and not injection of resin. Such an embodiment also constitutes an advantageous variant, especially in terms of overall cost for manufacturing a composite piece.

The composite pieces likely to be obtained according to the process of the invention also for integral parts of the invention, in particular pieces which have a volume rate of fibres of 50 to 63% and especially of 53 to 60%.

The examples hereinbelow illustrate the invention, without having a limiting character.

Exemplary Embodiments

Description of Starting Materials

The material used for these assays is the following:

Sheet of 3 carbon threads IMA 12K, 446Tex, of the company Hexcel, associated with a thermoplastic veil 128D06 of the company Protechnic on each side.

The tape is calibrated in width to 5.97 mm (deviation type: 0.16 mm) according to the process described in patent application FR08 58096, using the following settings:

| Line speed (m/min) | T bar (° C.) (9) | T bar (° C.) (10) | T veil preheating (° C.) (11a and 11b) | T bars (° C.) (12a and 12b) |
|---|---|---|---|---|
| 1.3 | 257 | 257 | 160 | 180 |

The final grammage of the resulting ribbon is 224 g/m$^2$.

Process Used for Depositing the Ribbons:

Automatic contact application, ribbon by ribbon, was carried out by a head which guarantees that the thread is held during deposit by eliminating any lateral movement.

The application head of reinforcing threads on a deposit surface comprises:

A support structure composed of a support plate delimiting a front face and a rear face on both sides. The motor elements are supported by the rear face which is provided with passages for the axes of transmission so that the functional elements are located to the side of the front face of the support plate.

A guide device to the application zone, of at least one reinforcing thread coming from a storage device. This device is borne by the front face.

An applicator element of roller type mounted on a shifting device for applying pressure on the reinforcing thread in contact with the deposit surface.

A system for heating reinforcing threads closest to the application zone.

A mechanism for cutting reinforcing threads upstream of the application zone on the deposit surface, this mechanism comprising at least one cutting element and a motor element (of rotating type) for shifting cutting element on the one hand, according to an out course for enabling cutting of the reinforcing threads and on the other hand, according to a return course for enabling disengagement of the cutting element relative to the reinforcing threads. The cutting mechanism comprises an anvil on which the cutting element ensures cutting of the reinforcing threads.

A redirection system of the reinforcing threads after being cut, at least as far as the application zone, this redirection system comprising motorisation (of rotating type).

A mechanism for tightening the reinforcing threads controlled by displacement by a rotating motor element mounted on the rear face of the support plate.

This head is mounted on a robot M16ib by the company FANUC, said robot having capacities for the precision and reproducibility necessary for the precise depositing such as described. Each ribbon is deposited flat, the deposit being done by heating the preceding fold by means of a hot-air pistol of the brand LEICESTER, model LE Mini Sensor, version 800W. The air inlet rate is 25 liters per minute, a burst at a rate of 11 liters per minute being created after heating. The inlet pressure is approximately equal to 0.2 bar, and the deposit speed is 30 mm/s. The distance between the hot-air exit nozzle and the heated fold is around 5 mm such that the deposit is done smoked, that is, without degrading the yarning of the carbon threads of the tape and of the preceding fold and with satisfactory adhesion. The support of the placing roller on the surface, whether comprising for example a plastic film or strips of carbon already deposited constituting the preceding fold, is translated by a force located in the range 700 cN to 900 cN.

The first fold, due to the absence of the preceding fold, has been deposited in the same way without heat, the ends of the ribbons being stuck by double-sided Scotch at their end on around 20 mm, the deposit always being automatic.

Eight folds have been deposited for each preform according to a quasi-isotropic stack (45°, 0°, 135°, 90°, 90°, 135°, 0°, 45°).

Four preforms of a size of 305×305 mm have been made. The first without space between the deposited ribbons, the second with a space of 0.2 mm between two adjacent deposited ribbons, the third with a space of 0.4 mm between two adjacent ribbons deposited with exact superposition of the ribbons in the two folds oriented at 90° and the fourth with a space of 0.4 mm between two adjacent ribbons deposited with offsetting of a semi-width of a ribbon in the two folds oriented at 90°.

Characteristics of the Preforms and/or the Resulting Pieces.

Several preforms of 8 folds have been made, the latter having undergone the following tests:

Weighing of the preform of 8 folds to determine the mass by folds and calculate the Volume Fibre Rate (TVF) before and after infusion and baking, Measuring thickness of the preform under 1 mbar of residual pressure for measuring the TVF, Infusion with the resin RTM6 by Hexcel, followed by the baking cycle prescribed by the product record, and thickness measurement to deduce the TVF, Recording of the quantity of resin entering the preform as a function of time, Measuring of the transverse permeability of each preform according to the method described in patent application WO 2010/046609. Transverse permeability can be defined by the aptitude of fluid to pass through fibrous material in the transverse direction, therefore outside the plane of the reinforcing. It is measured in $m^2$. The values given hereinabove, as well as those mentioned in the following examples, are measured with the apparatus and measuring technique described in the thesis entitled <<Problematic of measuring transverse permeability of fibrous preforms for the manufacture of composite structures>>, by Romain Nunez, defended at the Ecole Nationale Superieure des Mines de Saint Etienne, on Oct. 16 2009, to which reference on could be made for more details. The measuring is especially conducted with control of the thickness of the sample during the test by using two co-cylindrical chambers to reduce the influence of <<race-tracking>> (passage of fluid to the side or <<on the side>> of the material whereof the permeability is to be measured). The fluid used is water and the pressure is 1 bar+/−0.01 bar. This test needed three preforms of each type to be made.

| Example Space between threads | Volume rate of fibre preform under reduced pressure (4 mBar residual) | Volume rate of fibre panels infused under reduced pressure | Final surface mass per measured fold |
|---|---|---|---|
| Comparative Example 1 None | 59% | 60.70% | 226 g/m$^2$ |
| Ex. 1 0.2 mm with successive superposed folds at 90° without offsetting | 58% | 59.70% | 219 g/m$^2$ |
| Ex. 2 0.4 mm h successive folds at 90° superposed without offsetting | 53.50% | 58.70% | 209 g/m$^2$ |
| Ex. 3 0.4 mm with successive folds at 90° superposed with offsetting of ½ space | 56% | 59.1% | 209 g/m$^2$ |

Each individual fold has an opening factor of 0.2×100/(5.98+0.2)=3.2% (Ex1); 0.4×100/(5.98+0.4)=6.3% (Ex2, Ex3), and 0% for Comparative Example 1.

Infusion Technique

Figure 6:
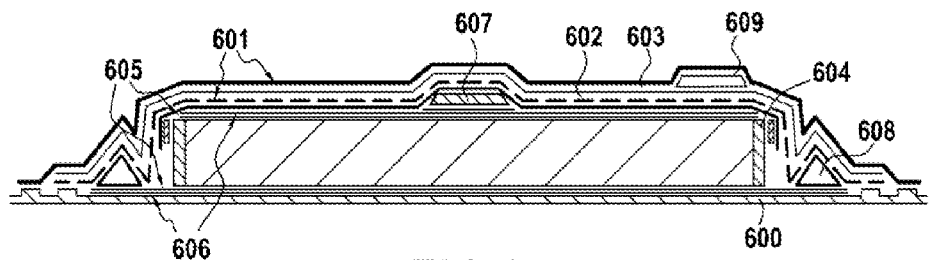
FIG. 6 is a schematic view of a device which can be used for making composite pieces.

Infusion of the resin is done, by using a device such as shown in FIG. 6, in which the following references are used: I: preform, 600: metal base plate, 601: vacuum bag, 602: semi-permeable membrane, 603: non-woven. 604: Scotch tape, 605: peel ply, 606: material of diffusion, 607: resin inlet, 608: resin outlet vacuum outlet, 609: vacuum line.

Infusion Procedure:

Prepare the vacuum bag by ensuring to seal the edges of the preform to guarantee pure transverse infusion, Heat the assembly to 100° C. in an enclosure, Apply the maximum vacuum (1 mbar residual) on the vacuum outputs and in the vacuum bag, Open the resin inlet previously heated to 80° C., When the preform is filled with resin, close the resin inlet and outlet by leaving the vacuum on the vacuum line above the membrane, Increase the temperature to 180° C., Maintain the maximum vacuum (1 mbar residual) in the vacuum bag, Wait for completion of baking and release the piece from the mould.

Example of Filling of Preforms During Infusion

Figure 7:
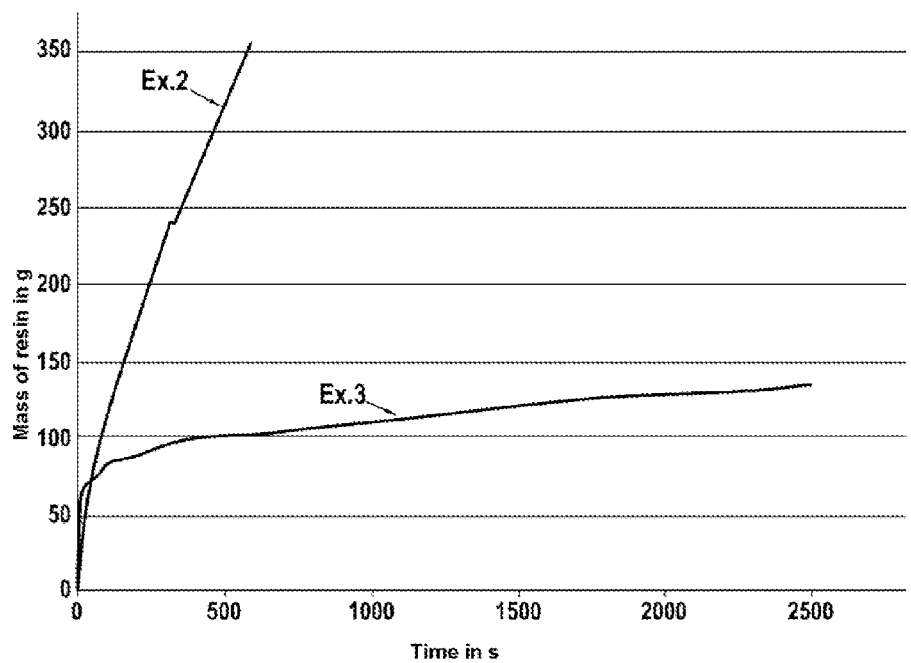
FIG. 7 shows the evolution of the resin filling rate when the configurations illustrated in FIGS. 3A and 3B are used by the infusion process under vacuum.

The graph presented in FIG. 7 shows that:

The preform in which the superposed ribbons of the two successive folds in the same orientation at 90° are perfectly aligned without offsetting very easily lets the resin return as a function of time.

The preform in which the superposed ribbons of the two successive folds in the same orientation at 90° are offset by a semi-width of ribbon let only very little resin return as a function of time. This is explained by the fact that the channels created by the spaces between ribbons are stopped and therefore no longer allow the resin to run out between the folds.

Measurements of Permeability

Figure 8:
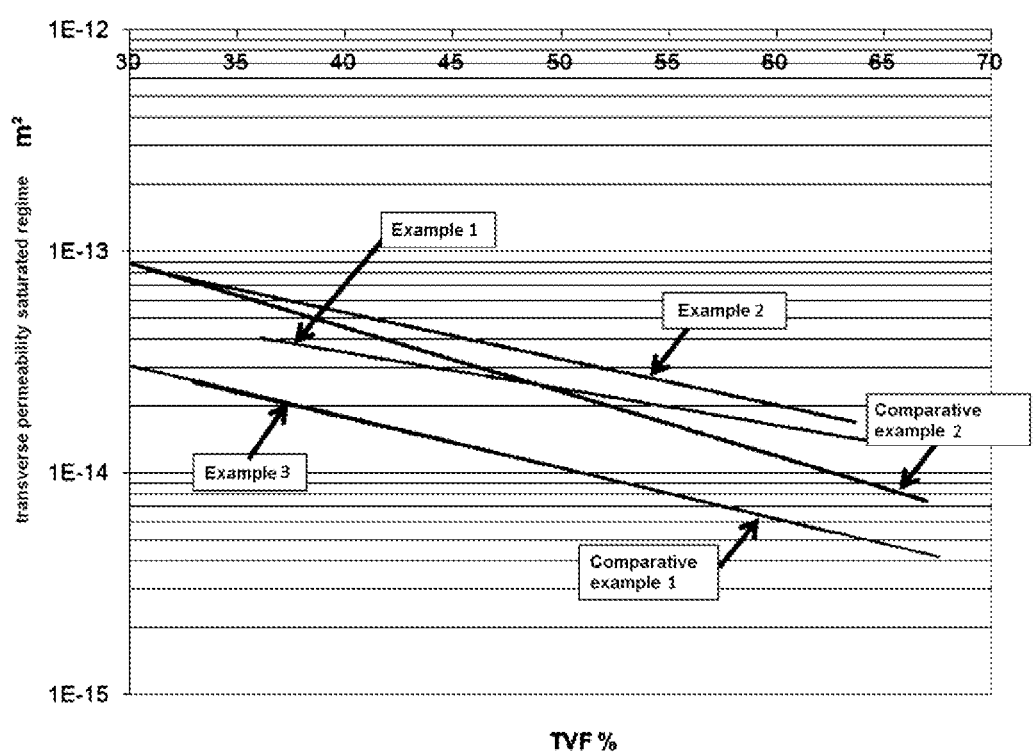
FIG. 8 represents the evolutions of transverse permeability as a function of the TVF obtained for materials according to the invention and comparative materials.

In FIG. 8, each curve is the average of three measurements. Each measurement has been made on a preform a single time.

The results presented in FIG. 8 show that the preforms made by successive deposits of ribbons spaced with spaces between ribbons of 0.4 and 0.2 mm for tapes of 5.97 mm of 226 g/m² are more permeable than Serge fabric 2/2 of 300 g/m² considered as the reference in the range 55-60% of TVF (Comparative Example 2). In this example, a preform of four folds of fabric 48302 (Hexcel reference) has been draped in a stack 0/90, 45/135, 0/90, 45/135. By comparison, the permeability of a preform in which the superposed ribbons of two successive folds in the same orientation at 90° are offset by a semi-width of ribbon is identical to the permeability of a preform made without space between veiled ribbons.

The invention claimed is:

1. A method for making an intermediate material comprising a preform made up of multiple layers of veiled ribbons, said preform having a principal axis and wherein said method comprises the steps of:

providing a first layer comprising first veiled ribbons that are oriented parallel to each other in a first angular direction with respect to said principal axis, said first veiled ribbons each comprising a layer of first unidirectional fibers and a veil of thermoplastic located on a first side of said layer of first unidirectional fibers and a veil of thermoplastic located on a second side of said layer of first unidirectional fibers, said first veiled ribbons each comprising edges that define the widths of said first veiled ribbons wherein said first veiled ribbons are spaced apart in said first layer to provide first linear gaps between said first veiled ribbons that are adjacent to each other;

providing a second layer comprising second veiled ribbons that are oriented parallel to each other in said first angular direction with respect to said principal axis, said second veiled ribbons each comprising a layer of second unidirectional fibers and a veil of thermoplastic located on a first side of said layer of second unidirectional fibers and a veil of thermoplastic located on a second side of said layer of second unidirectional fibers, said second veiled ribbons each comprising edges that define the widths of said second veiled ribbons wherein said second veiled ribbons are spaced apart in said second layer to provide second linear gaps between said second veiled ribbons that are adjacent to each other;

bonding said second layer to said first layer so that the first side of said layer of first unidirectional fibers is adjacent to the first side of said layer of second unidirectional fibers, said first veiled ribbons and said second veiled ribbons being superposed over each other so that said first linear gaps are aligned with said second linear gaps;

providing a third layer comprising third veiled ribbons that are oriented parallel to each other in a second angular direction with respect to said principal axis, said second angular direction being different from said first angular direction, said third veiled ribbons each comprising a layer of third unidirectional fibers and a veil of thermoplastic located on a first side of said layer of third unidirectional fibers and a veil of thermoplastic located on a second side of said layer of third unidirectional fibers, said third veiled ribbons each comprising edges that define the widths of said third veiled ribbons wherein said third veiled ribbons are spaced apart in said third layer to provide third linear gaps between said third veiled ribbons that are adjacent to each other;

bonding said third layer to said first layer so that the second side of said layer of first unidirectional fibers is adjacent to the first side of said layer third unidirectional fibers;

providing a fourth layer comprising fourth veiled ribbons that are oriented parallel to each other in a third angular direction with respect to said principal axis, said third angular direction being different from said first angular direction and said second angular direction, said fourth veiled ribbons each comprising a layer of fourth unidirectional fibers and a veil of thermoplastic located on a first side of said layer of fourth unidirectional fibers and a veil of thermoplastic located on a second side of said layer of fourth unidirectional fibers, said fourth veiled ribbons each comprising edges that define the widths of said fourth veiled ribbons wherein said fourth veiled ribbons are spaced apart in said fourth layer to provide fourth linear gaps between said fourth veiled ribbons that are adjacent to each other;

bonding said fourth layer to said third layer so that the second side of said layer of third unidirectional fibers is adjacent to the first side of said layer of fourth unidirectional fibers;

providing a fifth layer comprising fifth veiled ribbons that are oriented parallel to each other in a fourth angular direction with respect to said principal axis, said fourth angular direction being different from said first angular direction, said fifth veiled ribbons each comprising a layer of fifth unidirectional fibers and a veil of thermoplastic located on a first side of said layer of fifth unidirectional fibers and a veil of thermoplastic located on a second side of said layer of fifth unidirectional fibers, said fifth veiled ribbons each comprising edges that define the widths of said fifth veiled ribbons wherein said fifth veiled ribbons are spaced apart in said fifth layer to provide fifth linear gaps between said fifth veiled ribbons that are adjacent to each other;

bonding said fifth layer said second layer so that the second side of said layer of second unidirectional fibers is adjacent to the first side of said layer of fifth unidirectional fibers;

providing a sixth layer comprising sixth veiled ribbons that are oriented parallel to each other in a fifth angular direction with respect to said principal axis, said fifth angular direction being different from said first angular direction and said fourth angular direction, said sixth veiled ribbons each comprising a layer of sixth unidirectional fibers and a veil of thermoplastic located on a first side of said layer of sixth unidirectional fibers and a veil of thermoplastic located on a second side of said layer of sixth unidirectional fibers, said sixth veiled ribbons each comprising edges that define the widths of said sixth veiled ribbons wherein said sixth veiled ribbons are spaced apart in said sixth layer to provide sixth linear gaps between said sixth veiled ribbons that are adjacent to each other; and bonding said sixth layer to said the fifth layer so that the second side of said layer of fifth unidirectional fibers is adjacent to the first side of said layer of sixth unidirectional fibers.

2. The method for making an intermediate material as set forth in claim 1 wherein said first layer, second layer, third layer, fourth layer, fifth layer and sixth layer each has an opening factor that is within the range of from 0.5 to 9%.

3. The method for making an intermediate material as set forth in claim 1 wherein the ratio between the widths of said first veiled ribbons and said first linear gaps is in the range of from 7 to 150.

4. The method for making an intermediate material as set forth in claim 1 wherein the ratio between the widths of said second veiled ribbons and said second linear gaps is in the range of from 7 to 150.

5. The method for making an intermediate material as set forth in claim 1 wherein the ratio between the widths of said third veiled ribbons and said third linear gaps is in the range of from 7 to 150.

6. The method for making an intermediate material as set forth in claim 1 wherein the ratio between the widths of said fourth veiled ribbons and said fourth linear gaps is in the range of from 7 to 150.

7. The method for making an intermediate material as set forth in claim 1 wherein the ratio between the widths of said fifth veiled ribbons and said fifth linear gaps is in the range of from 7 to 150.

8. The method for making an intermediate material as set forth in claim 1 wherein the ratio between the widths of said sixth veiled ribbons and said sixth linear gaps is in the range of from 7 to 150.

9. The method for making an intermediate material as set forth in claim 1 wherein the total mass of all of the veils of thermoplastic present in said preform represents from 0.1 to 10% of the total mass of the preform.

10. The method for making an intermediate material as set forth in claim 1 wherein the first unidirectional fibers, second unidirectional fibers, third unidirectional fibers, fourth unidirectional fibers, fifth unidirectional fibers and sixth unidirectional fibers are selected from the group of fibers consisting of carbon, glass, aramid, silica, ceramic fibers and their mixtures.

11. The method for making an intermediate material as set forth in claim 1 wherein each of the veils of thermoplastic have a surface mass in the range going from 0.2 to 20 g/m$^2$.

12. The method for making intermediate material as set forth in claim 11 wherein said layer of first unidirectional fibers, said layer of second unidirectional fibers, said layer of third unidirectional fibers, said layer of fourth unidirectional fibers, said layer of fifth unidirectional fibers and said layer of sixth unidirectional fibers each comprises a unidirectional tape of carbon fibers having a surface mass of 100 to 280 g/m$^2$.

13. The method for making intermediate material as set forth in claim 1 wherein said first veiled ribbons, said second veiled ribbons, said third veiled ribbons, said fourth veiled ribbons, said fifth veiled ribbons and said sixth veiled ribbons each has a thickness of 80 to 380 microns.

14. The method for making intermediate material as set forth in claim 13 wherein the thickness of 80 to 380 microns has a low variability such that variations in the thickness do not exceed 20 microns in terms of standard deviation.

15. The method for making intermediate material as set forth in claim 1 which includes the additional step of applying a thermosetting and/or thermoplastic resin to said preform.

16. The method for making intermediate material as set forth in claim 1 wherein said first angular direction with respect to said principal axis is 90° and wherein said second angular direction with respect to said principal axis is 135°.

17. The method for making intermediate material as set forth in claim 16 wherein said third angular direction with respect to said principal axis is 0°.

18. The method for making intermediate material as set forth in claim 17 wherein said fourth angular direction with respect to said principal axis is 135°.

19. The method for making intermediate material as set forth in claim 18 wherein said fifth angular direction with respect to said principal axis is 0°.

20. The method for making intermediate material as set forth in claim 19 which includes the additional step of applying a thermosetting and/or thermoplastic resin to said preform.

* * * * *